US009143872B2

(12) United States Patent
Roos et al.

(10) Patent No.: US 9,143,872 B2
(45) Date of Patent: Sep. 22, 2015

(54) WIRELESS STREAMING LINK BREAK-IN

(75) Inventors: Rene Roos, Rhodes (AU); Werner Meskins, Opwijk (BE); Philip Gielis, Everberg (BE); Alex von Brasch, Cremorne (AU); Orlando Wu, Sydney (AU); Rami Banna, Sydney (AU)

(73) Assignee: Cochlear Limited, Nacquarie University (AU)

( * ) Notice: Subject to any disclaimer, the term of this patent is extended or adjusted under 35 U.S.C. 154(b) by 281 days.

(21) Appl. No.: 13/406,702

(22) Filed: Feb. 28, 2012

(65) Prior Publication Data

US 2013/0223663 A1 Aug. 29, 2013

(51) Int. Cl.
*G06F 17/00* (2006.01)
*H04R 25/00* (2006.01)

(52) U.S. Cl.
CPC .............. *H04R 25/55* (2013.01); *H04R 25/606* (2013.01); *H04R 2225/021* (2013.01); *H04R 2225/023* (2013.01); *H04R 2225/025* (2013.01); *H04R 2225/43* (2013.01)

(58) Field of Classification Search
CPC ...... H04R 25/00; H04R 25/70; H04R 25/606; G06F 17/00; H04W 92/04; A61N 1/08; A61F 2/18; H04B 3/00
USPC ............ 370/329, 401, 252, 328, 392; 381/77, 381/313-315; 700/94; 607/57, 60; 600/25; 623/10
See application file for complete search history.

(56) References Cited

U.S. PATENT DOCUMENTS

| | | | | |
|---|---|---|---|---|
| 2006/0265061 | A1* | 11/2006 | Kwon et al. | 623/10 |
| 2007/0009124 | A1* | 1/2007 | Larsen | 381/315 |
| 2009/0067653 | A1* | 3/2009 | Meskens et al. | 381/315 |
| 2010/0036463 | A1* | 2/2010 | Bange et al. | 607/60 |
| 2010/0158292 | A1* | 6/2010 | Pedersen | 381/315 |
| 2011/0033071 | A1* | 2/2011 | Larsen | 381/315 |
| 2011/0149967 | A1* | 6/2011 | Chen et al. | 370/392 |
| 2012/0033620 | A1* | 2/2012 | Thoen et al. | 370/329 |

FOREIGN PATENT DOCUMENTS

WO WO 2013020588 A1 * 2/2013

OTHER PUBLICATIONS

Cochlear Nucleus CR110 Remote Assistant User Guide 2010.
User Guide for ReSound Unite™ TV, downloaded Jan. 13, 2012 from www.gnresound.com/hearing-aids/unitetvstreamer.aspx.
User Guide for ReSound Unite™ Phone Clip, downloaded Jan. 13, 2012 from www.gnresound.com/hearing-aids/unite/unitephoneclip.aspx.

* cited by examiner

*Primary Examiner* — Jamal Javaid
*Assistant Examiner* — Wali Butt
(74) *Attorney, Agent, or Firm* — McDonnell Boehnen Hulbert & Berghoff LLP

(57) ABSTRACT

A system and method for wireless streaming link break-in is disclosed. A first device transmits digital packets to a second device over a wireless streaming link. A third device synchronizes itself with the second device. Once the third device is synchronized with the second device, the third device transmits command request packets to the second device during a data receive window. The wireless streaming link is inactive during the data receive window. The second device responds to the request during a next data receive window.

20 Claims, 4 Drawing Sheets

WIRELESS STREAMING LINK BREAK-IN

FIELD

The present invention relates generally to wireless streaming links, and more particularly, relates to a system and method that allows a device to break into communications over a wireless streaming link between two other devices.

BACKGROUND

Wireless streaming link designs typically consist of multiple data packets that are sent at a regular interval from a first device to a second device. In order to minimize power consumption, the on-air time of the link is not constant. Rather, when all data has been sent, the link is inactive for a specific period of time. Once synchronized to the stream, the second device listens for data packets at specific timeslots on specified frequencies according to a streaming protocol. In some such designs, beacons are transmitted by the second device in order to enable a third device to synchronize with the second device.

SUMMARY

A system that allows for wireless streaming link break-in is disclosed. In one example, the system includes a first device that is configurable to transmit a first type of digital packets to a second device at a first rate utilizing a synchronous communication link over a first group of frequency channels. The system also includes a third device that is configurable to transmit a second type of digital packets to the second device utilizing an asynchronous communication link over a second group of frequency channels. The first group of frequency channels is non-overlapping with the second group of frequency channels. The second device is configurable to listen for the first type and the second type of digital packets.

In another example, the system includes a synchronous communication network in which a second device receives digital signals at a first rate from a first device. The system also includes an asynchronous communication network in which the second device listens for digital requests at a second rate slower than the first rate from a third device and in which the second device responds to the digital requests.

A method that allows for wireless streaming link break-in is also disclosed. While a device is receiving digital data transmissions in a first group of receive windows, the method includes sending request packets to the device until receiving an acknowledgement signal from the device. Upon receiving the acknowledgement signal, the method includes sending a command request in a second group of receive windows. The method also includes receiving a response to the command request.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
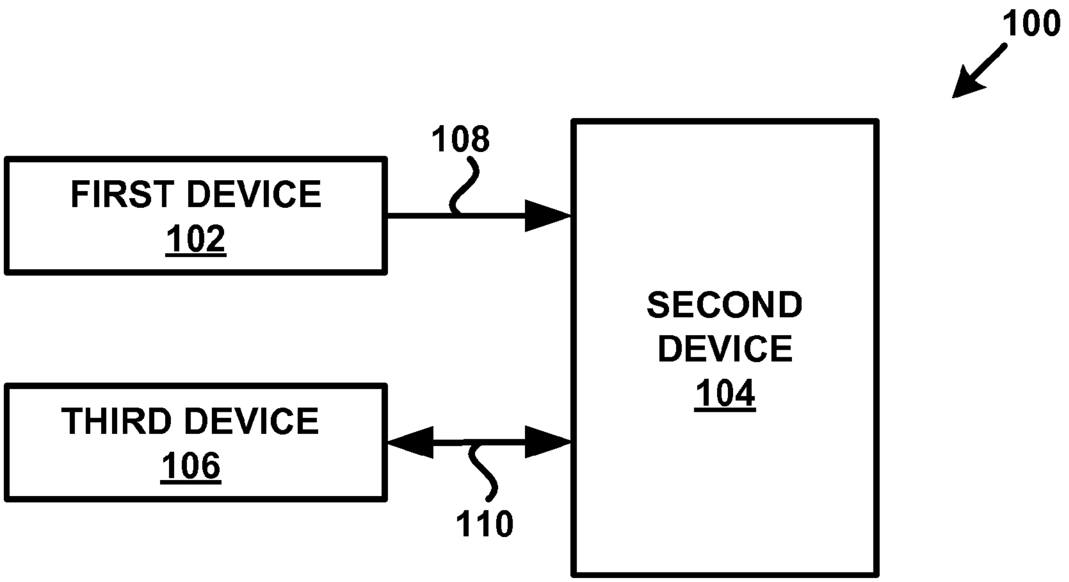
FIG. 1 is a block diagram of a system that allows for wireless streaming link break-in, according to an example.

FIG. 1 is a block diagram of a system 100. The system 100 includes a first device 102, a second device 104, and a third device 106. The first device 102 uses a wireless streaming link 108 to transmit data to the second device 104. The third device 106 uses a bidirectional communication link 110 to communicate with the second device 104.

The first device 102 transmits data in a synchronous manner to the second device 104 over the wireless streaming link 108. The data may be streamed as digital packets over one or more frequency channels. The digital packets may include digital audio data. The synchronous communication network formed by the first device 102, the wireless streaming link 108, and the second device 104 may be a Time Division Multiple Access (TDMA), a slow Frequency Hopping Spread Spectrum (FHSS), a Frequency Agility (FA), a Slow Frequency Agility (SFA) communications network, or other appropriate network type.

The second device 104 communicates with the third device 106 over the bidirectional communication link 110 in an asynchronous manner. Data may be transmitted over the bidirectional communication link 110 as digital packets over one or more frequency channels. The digital packets may include digital control data. The asynchronous communication network formed by the second device 104, the bidirectional communication link 110, and the third device 106 may be a slow Frequency Hopping Spread Spectrum (FHSS), a Frequency Agility (FA), a Slow Frequency Agility (SFA) communications network, or other appropriate network type.

Preferably, the frequency channels used with the bidirectional communication link 110 are non-overlapping with the frequency channels used with the wireless streaming link 108. However, the frequency channels may overlap. If the frequency channels overlap, it may be beneficial to use error correction and/or various transmission schemes (e.g., streaming digital audio packets using a fast frequency hopping scheme) to avoid disruptions.

In one example, the synchronous communication network includes at least eight frequency channels. The asynchronous communication network includes one or more frequency channels that are non-overlapping with the at least eight frequency channels. However, it is understood that other numbers of frequency channels may be used.

The second device 104 is designed to listen for the digital packets transmitted by the first device 102 via the wireless streaming link 108. Once synchronized to the stream, the second device 104 may listen for data packets at specified timeslots on specified frequencies according to a streaming protocol. For example, the second device 104 may listen for the digital packets at evenly spaced intervals of time.

The second device 104 is also designed to listen for digital requests from the third device 106 via the bidirectional communication link 110. The second device 104 may listen for the digital requests from the third device 106 at a rate slower than the rate that the second device 104 receives digital packets from the first device 102. The slower rate is due to the third device 106 using idle time of the wireless streaming link 108 to communicate with the second device 104.

The first device 102 is any device that transmits digital packets. For example, the digital packets may contain digital audio data. In one example, the first device 102 is a wireless audio streamer connected to a television, a radio, a sound system, a multimedia system, or a telephone. In another example, the first device 102 is an assistive listening device with audio streaming capabilities, for example, through audio in-line or internal audio generation from memory (e.g., MP3). The first device 102 may also be a remote control, a programmer, a dongle, and so on.

The second device 104 may be a processor. If the first device 102 transmits digital packets containing digital audio data, the processor may be a sound processor. As another example, the second device may be a hearing prosthesis that includes a sound processor. This non-limiting example is depicted in FIG. 2.

The third device 106 is a device that can control, adjust, program, and/or change a parameter of the second device 104. For example, the third device 106 may be a remote control, a programmer, a dongle, or a mobile telephone (e.g., a smartphone). The example of a remote control is described with respect to FIG. 2.

The programmer, dongle, or mobile telephone may include the same wireless hardware (i.e., physical layer) as the remote control. The programmer may be designed to reprogram the second device 104, at least partially, after synchronizing with the second device 104. The dongle may be located on a personal computer (or other computing device) and be designed to control, adjust, and/or program the second device 104. The smartphone may be designed to control and/or change a parameter of the second device 104.

Figure 2:
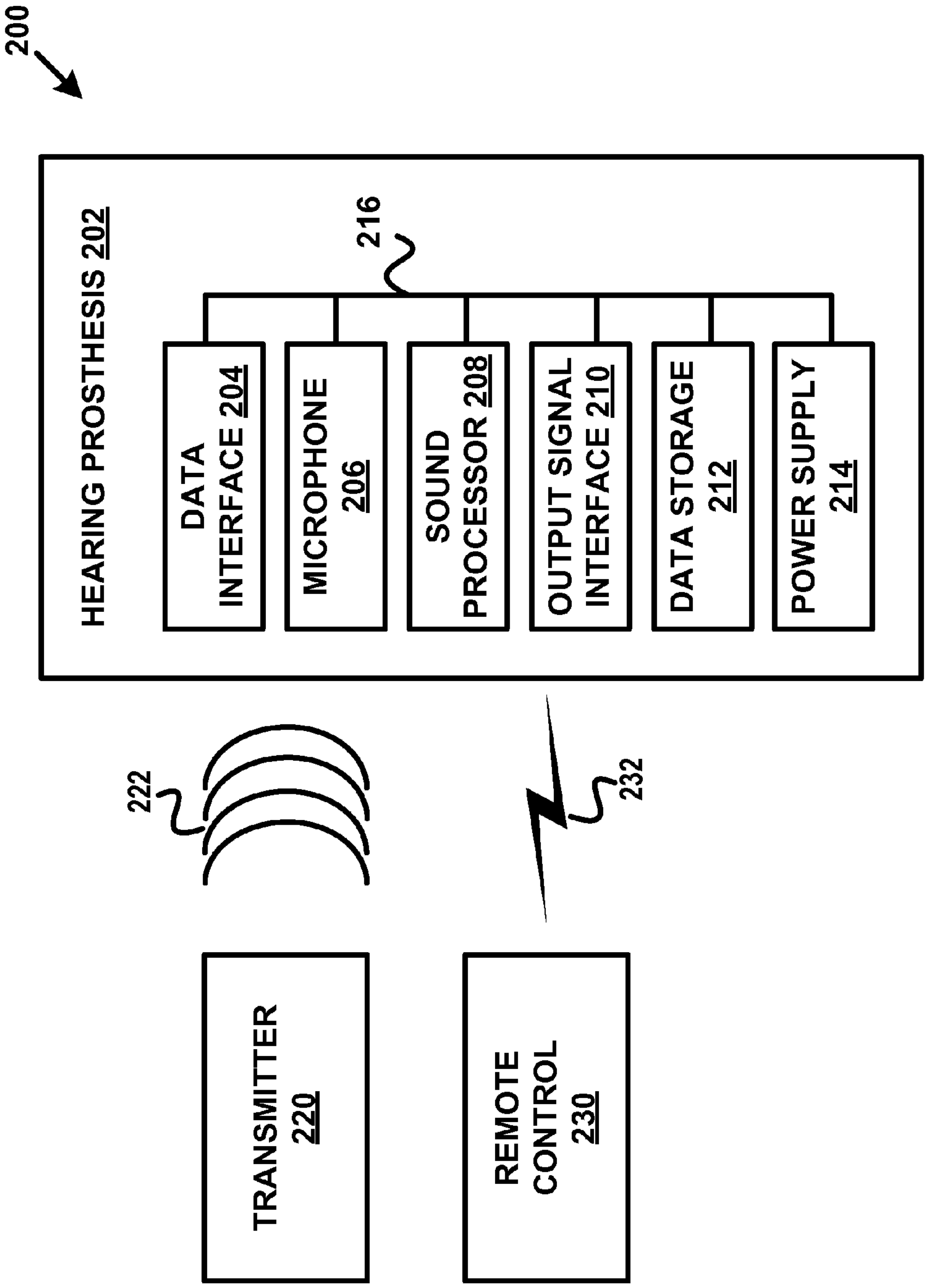
FIG. 2 is a block diagram of a system including a hearing prosthesis, according to an example.

FIG. 2 is a block diagram of a system 200. The system 200 includes a hearing prosthesis 202, a transmitter 220, and a remote control 230. The system 200 is just one example of a system that allows a third device to break-in to communications with a second device that is already receiving communications from a first device.

The hearing prosthesis 202 may be a cochlear implant, an acoustic hearing aid, a bone anchored hearing aid or other vibration-based hearing prosthesis, a direct acoustic stimulation prosthesis, an auditory brain stem implant, or any other type of hearing prosthesis now known or later developed that is configured to aid a prosthesis recipient in hearing sound.

The hearing prosthesis 202 includes a data interface 204, a microphone 206, a sound processor 208, an output signal interface 210, data storage 212, and a power supply 214 all of which may be connected directly or indirectly via circuitry 216. The hearing prosthesis 202 may have additional or fewer components than the prosthesis shown in FIG. 2. Additionally, the components may be arranged differently than shown in FIG. 2.

The data interface 204 may be any type of wired or wireless communications interface now known or later developed that can be configured to send and/or receive data. In operation, the data interface 204 is configured to send and/or receive data to and/or from an external device. The data interface 204 is configured to receive data from the transmitter 220 and to send data to and receive data from the remote control 230. For example, the data interface 204 receives audio data from the transmitter 220 and control data from the remote control 230. The audio data represents sounds. The control data is used to control the operation of the hearing prosthesis 202 or to request the operational status of the hearing prosthesis 202.

The microphone 206 of the hearing prosthesis 202 may be an external microphone, a partially-implanted microphone, or a fully-implanted microphone. The microphone 206 may be configured to detect external sound waves and generate electrical signals based at least in part on the external sound waves for analysis by the sound processor 208.

The sound processor 208 is configured to receive electrical signals from the microphone 206, and generate instructions for generating and applying output signals to the recipient's ear via the output signal interface 210. The output signal interface 210 is configured to generate and apply the output signals to the recipient's ear based on the instructions received from the sound processor 208.

In examples where the hearing prosthesis 202 is a cochlear implant, the output signal interface 210 may include an array of electrodes, and the output signals may be a plurality of electrical stimulation signals applied to the recipient's cochlea via the array of electrodes (not shown). In examples where the hearing prosthesis 202 is a direct acoustic stimulator, the output signal interface 210 may include a mechanical actuator, and the output signals may be a plurality of mechanical vibrations applied to the recipient's middle and/or inner ear via the mechanical actuator (not shown). In examples where the hearing prosthesis 202 is an acoustic hearing aid, the output signals interface 210 may be a speaker, and the output signals may be a plurality of acoustic signals applied to the recipient's outer or middle ear via the speaker (not shown). In examples where the hearing prosthesis 202 is a bone-anchored hearing aid or other type of mechanical vibration based hearing prosthesis, the output signal interface 210 may include a mechanical actuator (not shown), and the output signals may be a plurality of mechanical vibrations applied to the recipient's skull, teeth, or other cranial and/or facial bone via the mechanical actuator. In examples wherein the hearing prosthesis 202 is an auditory brain stem implant, the output signal interface 210 may include an array of electrodes, and the output signals may be a plurality of electrical signals applied to the recipient's brain stem via the array of electrodes.

The data storage 212 can be any type of non-transitory, tangible, computer readable media now known or later developed that can be configured to store program code for execution by the hearing prosthesis 202 and/or other data associated with the hearing prosthesis 202.

The power supply 214 supplies power to various components of the hearing prosthesis 202. The power supply 214 may be any suitable power supply, such as a non-rechargeable or rechargeable battery. The hearing prosthesis 202 is power sensitive because power losses occur during the transfer of power to the implantable components of the hearing prosthesis 202. The amount of power loss is related to the skin thickness of the recipient. For example, if the hearing prosthesis 202 is a cochlear implant, power losses occur when transferring power to the array of electrodes.

Due to these power losses, power consumption is a critical operational factor for the hearing prosthesis 202. Some devices emit synchronization signals (sometimes referred to as beacons) that allow other devices to synchronize with the device broadcasting the beacon. The hearing prosthesis 202 saves power by eliminating the need for beacons.

The transmitter 220 may be any device that transmits digital packets 222 to the hearing prosthesis 202. The transmitter 220 is a combination of hardware and software components. In one example, the transmitter 220 includes a processor, non-volatile memory storage device for storing software and possibly other information, and an antenna for transmitting digital packets over a wireless streaming link 222. The transmitter 220 is not limited to any particular transmitter design.

For example, the transmitter 220 may be a commercially available wireless audio streamer or an assistive listening device.

The remote control 230 may be any device operable to communicate over a wireless communication link 232 in a bidirectional manner with the hearing prosthesis 202. The remote control 230 is a combination of hardware and software components. In one example, the remote control 230 includes a processor, non-volatile memory storage device for storing software and possibly other information, and a transceiver for transmitting and receiving digital packets over the bidirectional communication link 232.

The remote control 230 sends control signals to the hearing prosthesis 202 to control the operation of the hearing prosthesis 202. In response, the hearing prosthesis 202 changes operational settings, such as sensitivity, volume, and mixing ratio. The remote control 230 also sends control signals to the hearing prosthesis 202 to request status information, such as the status of the power supply 214, the microphone 206, and connections of the hearing prosthesis 202. In response, the hearing prosthesis 202 sends the remote control 230 status information regarding settings, battery alarms, diagnostic errors, and so on.

The remote control 230 may be used by a recipient of the hearing prosthesis 202. Additionally or alternatively, the remote control 230 may be used by a parent or other person, such as a clinician. For example, the recipient of the hearing prosthesis 202 may be a child and a parent may use the remote control 230 to verify that the hearing prosthesis 202 is properly functioning and that the child can hear.

Prior to operation, the remote control 230 is associated (sometimes referred to as "paired") with the hearing prosthesis 202. The remote control 230 includes a software program that instructs the recipient how to associate the remote control 230 with the hearing prosthesis 202. During pairing, the remote control 230 and the hearing prosthesis 202 agree to communicate with each other by exchanging addresses or passkeys. After the remote control 230 is associated with the hearing prosthesis 202, the hearing prosthesis 202 and the remote control 230 may communicate with each other.

The hearing prosthesis 202 is also paired with the transmitter 220. However, the remote control 230 is not paired with the transmitter 220. In fact, the remote control 230 may be unaware of the existence of the transmitter 220. Moreover, if the remote control 230 were to scan for wireless transmitters communicating with the hearing prosthesis 202, the remote control 230 may not detect the transmitters if they were out of range of the remote control 230, but not the hearing prosthesis 202.

While the transmitter 220 is streaming digital packets over the wireless streaming link 222 to the hearing prosthesis 202, the remote control 230 wants to communicate with the hearing prosthesis 202. Because the remote control 230 may be unaware that the transmitter 220 is streaming digital packets over the wireless streaming link 222 to the hearing prosthesis 202, the remote control 230 needs to be able to communicate with the hearing prosthesis 202 in a manner that is independent of and does not interfere with the communications between the transmitter 220 and the hearing prosthesis 202. Because the hearing prosthesis 202 is not broadcasting a beacon signal for synchronization, the remote control 230 needs to synchronize itself with the sound processor 208 of the hearing prosthesis 202. This process is described with respect to FIGS. 3-4. Notably, this process also works when the transmitter 220 is inactive.

Figure 3:
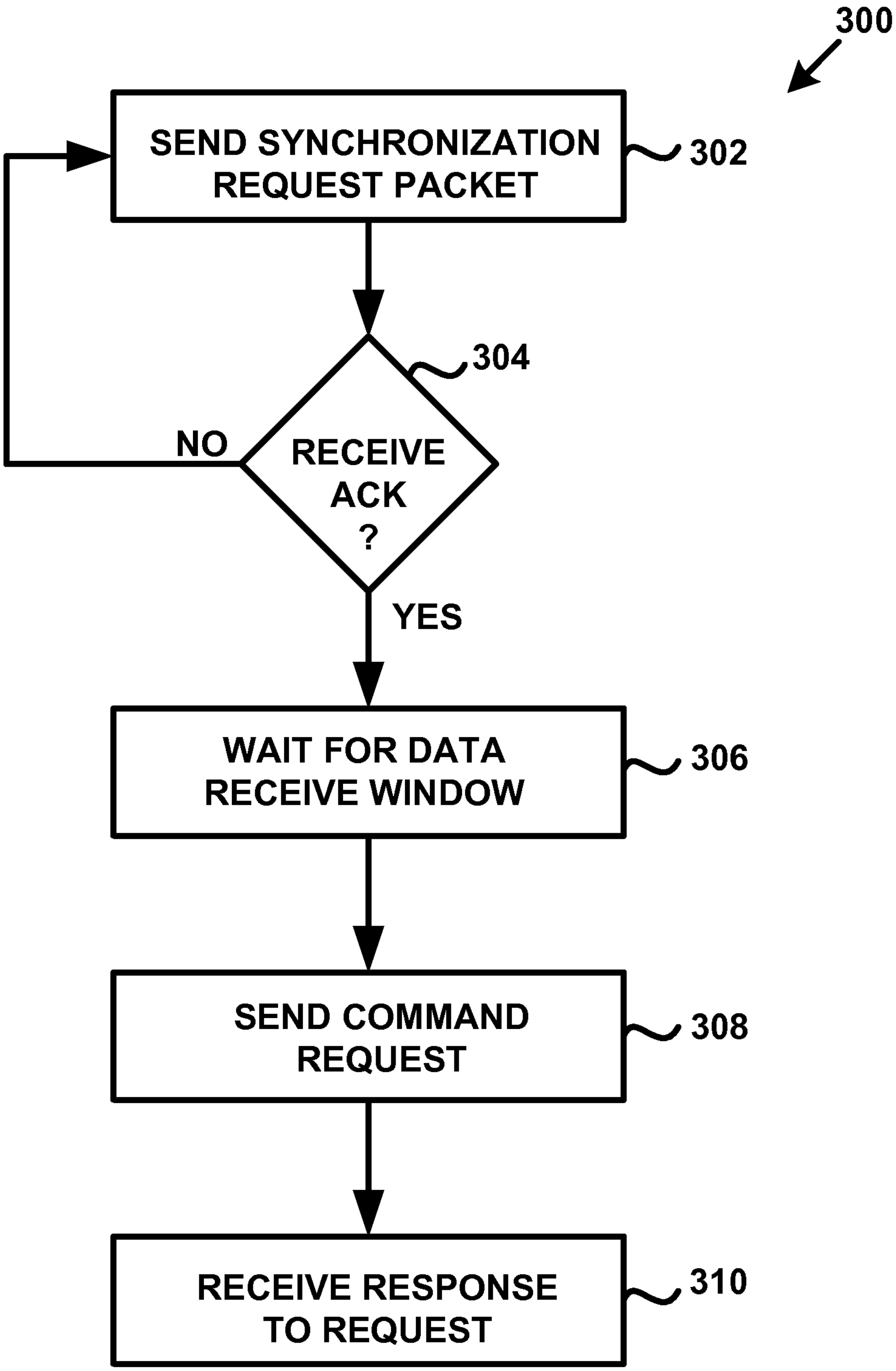
FIG. 3 is a flow diagram of a method that allows for wireless streaming link break-in, according to an example.

FIG. 3 is a flow diagram of a method 300. The method 300 allows a device to break into communications over a wireless streaming link between two other devices. While the system 200 is used for purposes of describing the method 300, it is understood that other devices may be used.

At block 302, the remote control 230 sends a synchronization request packet to the hearing prosthesis 202. At block 304, the remote control 230 determines whether it has received an acknowledgement signal from the hearing prosthesis 202. If not, the remote control 230 continues to send synchronization request packets until receiving an acknowledgement signal.

This portion of the method 300 may be described as the non-synchronized phase. During the non-synchronized phase, the remote control 230 attempts to synchronize with the sound processor 208 of the hearing prosthesis 202. The remote control 230 may send multiple synchronization request packets in quick succession to the hearing prosthesis 202.

The remote control 230 may use a timing pattern for sending the synchronization packets that is designed to facilitate aligning the request with time slots not used for reception of digital packets by the hearing prosthesis 202. Additionally, the timing pattern is designed to account for the timing characteristics of the wireless streaming link 222. The timing pattern includes sequence length, packet spacing, and frequency composition.

For example, the remote control 230 may use multiple frequencies. The frequencies may be chosen such that they are different than the frequencies used by the transmitter 220. Alternatively, the transmitter 220 and the remote control 230 may use the same frequencies and avoid disruptions using error correction and/or a fast frequency hopping scheme. As another example, the receive window for break-in packets on the sound processor 208 is slightly larger than the on-air transmission time to improve responsiveness.

Returning to FIG. 3, at block 304, the remote control 230 checks for an incoming acknowledgement signal from the hearing prosthesis 202. The hearing prosthesis 202 would only send the acknowledgement signal once a transmit slot of the remote control 230 aligns with a receive window of the sound processor 208. The receipt of the acknowledgement signal ends the non-synchronized phase. The remote control 230 stops sending synchronization request packets, and starts the synchronized phase.

At block 306, the remote control 230 waits for the next data receive window of the sound processor 208. After synchronizing with the sound processor 208, the remote control 230 knows when to expect the next data receive window.

At block 308, the remote control 230 sends a command request packet during the data receive window. Alternatively, the remote control 230 may send multiple command request packets before, during, and after the data receive window to increase the likelihood that the command request packets are received by the sound processor 208.

At block 310, the remote control 230 receives a response from the sound processor 208. The sound processor 208 receives the command request packet and generates a response to the request. The remote control 230 receives the generated response in the next data timeslot.

Figure 4:
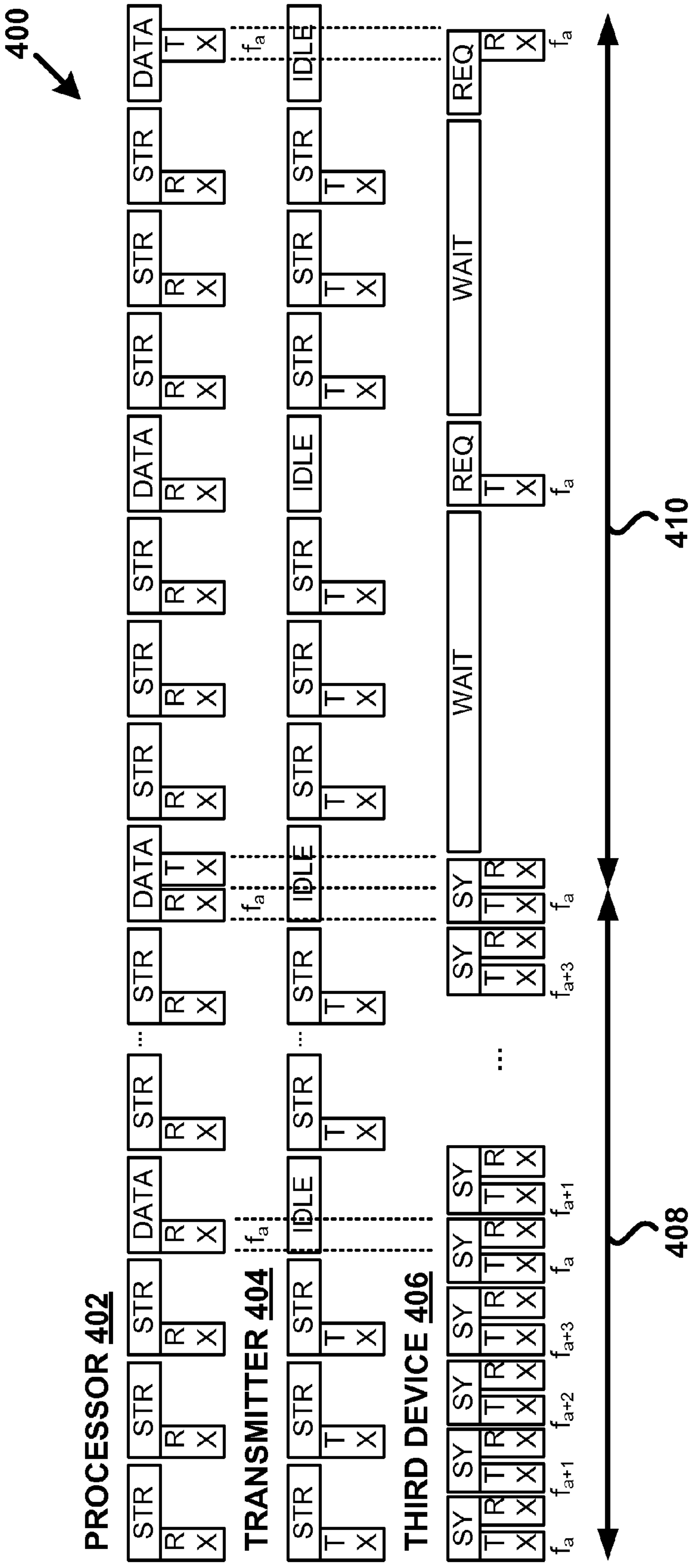
FIG. 4 is a timing diagram for the method depicted in FIG. 3, according to an example.

FIG. 4 is a timing diagram 400 that shows communications between the processor 402 and a third device 406 while a transmitter 404 is communicating with the processor 402. The third device 406 may be unaware that the transmitter 404 is communicating with the processor 402. The processor 402 and the transmitter 404 are synchronized. The transmitter 404 transmits (TX) data packets to the processor 402, which receives (RX) the data packets over the wireless streaming link (STR). In this example, the transmitter 404 is idle every fourth frame. During the fourth frame, the processor 402 is available to listen for other data transmissions.

The third device 406 transmits a series of synchronization request packets (SY) to the processor 402 during a non-synchronized phase 408. As seen in FIG. 4, the third device 406 sends a request packet (TX) and listens for a response (RX) multiple times in quick succession. The listening period is as short as possible without impacting the third device's ability to detect a response. Additionally, the third device 406 transmits the request packets at multiple frequencies (e.g., $f_a$, $f_{a+1}$, $f_{a+2}$, $f_{a+3}$). This continues until a receive window of the processor 402 aligns with one of the third device's transmit slots.

This alignment occurs during the second idle frame shown in FIG. 4 at frequency $f_a$. The processor 402 acknowledges the synchronization request by sending a reply packet to the third device 406. Upon receiving the reply packet, the third device 406 stops transmitting the synchronization request packets.

At this point, the third device 406 enters the synchronized phase 410. The third device 406 waits (WAIT) for the processor's next data receive window and then transmits a command request (REQ). The third device 406 transmits the command request at frequency $f_a$. The processor 402 receives the command request in the data receive window and transmits a response to the third device 406 in the next data receive window.

The method 300 allows both the transmitter 220 and the remote control 230 to communicate with the sound processor 208 at the same time. Additionally, the remote control 230 can communicate with the sound processor 208 in a bidirectional manner. Also, the remote control's communication with the sound processor 208 does not interfere with the digital packets that the sound processor 208 receives from the transmitter 220.

Moreover, the method 300 allows the remote control 230 to synchronize with the sound processor 208 without the sound processor 208 transmitting beacon signals that the remote control 230 could use to synchronize with the sound processor 208. The hearing prosthesis 202 saves power by not having to broadcast beacon signals. Moreover, beacon signals are problematic on airplanes as devices transmitting wireless signals are required to be turned off during taxiing and flight. When the hearing prosthesis 202 has to be turned off during flight mode, the recipient of the hearing prosthesis 202 cannot hear.

The remote control 230 also enjoys a power savings when a beacon is not used for synchronization as it does not need to be synchronized with the sound processor 208 at all times. Instead, the remote control 230 may be turned off when not in use. Additionally, the remote control 230 saves power by not scanning for wireless transmitters in order to find communication gaps.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system comprising:

a first device configured to transmit over a first group of frequency channels via a synchronous communication link a first type of digital packets to a second device; and a third device configured to transmit over a second group of frequency channels via an asynchronous communication link a second type of digital packets to the second device, wherein:

the first group of frequency channels is non-overlapping with the second group of frequency channels, the second device is a hearing prosthesis that includes: (1) a data interface configured to listen for (i) the first type of digital packets on the first group of frequency channels and (ii) the second type of digital packets on the second group of frequency channels, (2) a sound processor configured to receive audio and to generate instructions for generating and applying output signals to an ear, and (3) an output signal interface configure to generate and apply the output signals to the ear, and the second device communicates with the third device in a bidirectional manner.

2. A system comprising;

a synchronous communication network in which a hearing prosthesis receives digital signals from an external device in a first group of timeslots, wherein a first group of one or more frequency channels is used in the synchronous communication network; and an asynchronous communication network in which the hearing prosthesis listens for and responds to digital requests from a remote control device in a second group of timeslots, wherein:

multiple timeslots in the first group of timeslots separate timeslots in the second group of timeslots, a second group of one or more frequency channels is used in the asynchronous communication network, wherein the first group of one or more frequency channels is non-overlapping with the second group of one or more frequency channels, the hearing prosthesis communicates with the remote control in a bidirectional manner, and the hearing prosthesis comprises (1) a sound processor configured to receive audio and to generate instructions for generating and applying output signals to an ear, and (2) an output signal interface configure to generate and apply the output signals to the ear.

3. The system of claim 1, wherein the first type of digital packets includes digital audio data.

4. The system of claim 1, wherein the second type of digital packets includes digital control data.

5. The system of claim 1, wherein the first device is a device with data streaming capabilities.

6. The system of claim 1, wherein the third device is a remote control that controls at least the second device.

7. A system comprising;

a synchronous communication network in which a hearing prosthesis receives digital signals from an external device in a first group of timeslots, wherein a first group of one or more frequency channels is used in the synchronous communication network; and an asynchronous communication network in which the hearing prosthesis listens for and responds to digital requests from a remote control device in a second group of timeslots, wherein:

multiple timeslots in the first group of timeslots separate timeslots in the second group of timeslots, a second group of one or more frequency channels is used in the asynchronous communication network, wherein the first group of one or more frequency channels is non-overlapping with the second group of one or more frequency channels, the hearing prosthesis communicates with the remote control in a bidirectional manner, and the hearing prosthesis comprises (1) a sound processor configured to receive audio and to generate instructions for generating and applying output signals to an ear, and (2) an output signal interface configure to generate and apply the output signals to the ear.

8. The system of claim 7, wherein the synchronous communication network is one or more of a Time Division Multiple Access (TDMA) communication network, a slow Frequency Hopping Spread Spectrum (FHSS) communication network, a Frequency Agility (FA) communication network, or a Slow Frequency Agility (SFA) communication network.

9. The system of claim 7, wherein the asynchronous communication network is one or more of a slow FHSS communication network, an FA communication network, or an SFA communication network.

10. The system of claim 7, wherein the external device streams the digital signals to the hearing prosthesis.

11. A method comprising:

while a hearing prosthesis is receiving digital data transmissions in a first group of timeslots, sending synchronization request packets to the hearing prosthesis until receiving an acknowledgement signal from the hearing prosthesis, wherein the hearing prosthesis comprises (1) a sound processor configured to receive audio and to generate instructions for generating and applying output signals to an ear and (2) an output signal interface configure to generate and apply the output signals to the ear;

upon receiving the acknowledgement signal, sending to the hearing prosthesis a command request in a first timeslot included in a second group of timeslots;

receiving from the hearing prosthesis a response to the command request in a second timeslot included in the second group of timeslots; and communicating with the hearing prosthesis in a bidirectional manner, wherein the first group of timeslots is spread across a first group of frequency channels and the second group of timeslots is spread across a second group of frequency channels, wherein the first group of frequency channels is non-overlapping with the second group of frequency channels.

12. The method of claim 11, wherein the command request includes one of:

a request for status information, wherein the response to the command request includes the status information, or a request to adjust settings, wherein the response to the command request includes information regarding setting adjustments.

13. The method of claim 11, wherein sending the request packets includes sending multiple request packets in quick succession, wherein each of the multiple request packets is sent via a different frequency channel.

14. The method of claim 11, wherein sending the request packets includes using a timing pattern designed to cause the hearing prosthesis to receive one of the synchronization request packets in a timeslot in the second group of timeslots.

15. The method of claim 11, wherein sending the command request includes sending the command request multiple times.

16. The method of claim 11, wherein the first timeslot and the second timeslot are successive timeslots in the second group of timeslots.

17. The system of claim 1, wherein, in response to the second device receiving the second type of digital packets transmitted by the third device, the second device and the third device are further configured to synchronize communications over the asynchronous communication link without the second device transmitting a beacon signal.

18. The system of claim 7, wherein, in response to the hearing prosthesis responding to the digital request from the remote control device, the hearing prosthesis and the remote control are configured to synchronize communications over the asynchronous communication network without the hearing prosthesis transmitting a beacon signal.

19. The method of claim 11, wherein sending the synchronization request packets occurs without receiving a beacon signal from the hearing prosthesis.

20. The system of claim 1, wherein the data interface is further configured to listen for the second type of digital packets at evenly spaced intervals in time.

* * * * *

UNITED STATES PATENT AND TRADEMARK OFFICE

CERTIFICATE OF CORRECTION

PATENT NO. : 9,143,872 B2
APPLICATION NO. : 13/406702
DATED : September 22, 2015
INVENTOR(S) : Rene Roos et al.

It is certified that error appears in the above-identified patent and that said Letters Patent is hereby corrected as shown below:

On the title page, at (75), please delete the inventor name “Werner Meskins” and replace with:
-- Werner Meskens --

On the title page, at (73), please delete the assignee city “Nacquarie University” and replace with:
-- Macquarie University --

Signed and Sealed this
Twenty-sixth Day of January, 2016

Michelle K. Lee

*Director of the United States Patent and Trademark Office*